United States Patent [19]

Mehoudar

[11] Patent Number: 5,122,044
[45] Date of Patent: Jun. 16, 1992

[54] APPARATUS FOR MAKING A DRIP IRRIGATION CONDUIT

[75] Inventor: Raphael Mehoudar, Tel-Aviv, Israel
[73] Assignee: Hydro-Plan Engineering Ltd., Israel
[21] Appl. No.: 628,172
[22] Filed: Dec. 14, 1990

Related U.S. Application Data

[60] Division of Ser. No. 412,889, Sep. 26, 1989, Pat. No. 5,022,940, which is a continuation of Ser. No. 211,372, Jun. 24, 1988, abandoned.

[30] Foreign Application Priority Data

Jun. 24, 1988 [IL] Israel .......................... 86549

[51] Int. Cl.⁵ .............................................. B29C 47/02
[52] U.S. Cl. ...................................... 425/114; 264/172; 264/210.1
[58] Field of Search ............... 264/167, 172, 173, 174, 264/209.4, 210.1; 425/110, 114, 123, 126.2

[56] References Cited

U.S. PATENT DOCUMENTS

| | | | |
|---|---|---|---|
| 2,484,965 | 10/1949 | Slaughter | 264/149 |
| 2,575,138 | 11/1951 | Slaughter | 264/172 |
| 3,895,085 | 7/1975 | Suzuki et al. | 264/154 |
| 3,981,452 | 9/1976 | Eckstein | 239/542 |
| 4,307,841 | 12/1981 | Mehoudar et al. | 239/542 |
| 4,423,838 | 1/1984 | Dinur | 239/542 |
| 4,473,525 | 9/1984 | Drori | 264/156 |
| 4,573,640 | 3/1986 | Mehoudar | 239/542 |

Primary Examiner—Jay H. Woo
Assistant Examiner—W. J. Matney, Jr.
Attorney, Agent, or Firm—Steinberg & Raskin

[57] ABSTRACT

Apparatus for producing a drip irrigation conduit having discrete internally located emitter units bonded at axially spaced apart locations of an internal surface thereof, wherein the irrigation conduit is continuously extruded from an extrusion cross head at a first outer diameter and a first linear velocity and is drawn off through a calibrator unit to a second and lesser outer diameter at a second and greater linear velocity (greater than the first linear velocity), the emitter units being continuously supplied on a carrier member which extends from within the extruder cross-head to the region of an inlet of the calibrator unit. While so supported the emitter units are accelerated so as to attain an emitter unit linear velocity substantially equal to said second linear velocity and are displaced at this velocity into contact with the extruded conduit where the latter has substantially attained its second linear velocity and therefore continue to be displaced while still supported in contact with the extruded conduit until the emitter unit is heat welded.

7 Claims, 3 Drawing Sheets

APPARATUS FOR MAKING A DRIP IRRIGATION CONDUIT

This is a division of application Ser. No. 07/412,889, filed Sep. 26, 1989 now U.S. Pat. No. 5,022,940, which is turn is a continuation of Ser. No. 07/211,372, filed Jun. 24, 1988 now abandoned.

FIELD OF THE INVENTION

This invention relates to the introduction of elements into a plastic tube during the extrusion thereof and the bonding of these elements to the inner surface of the tube at predetermined locations. The invention relates particularly to a process and an installation or apparatus for producing a drip irrigation conduit having discrete internally located emitter units bonded at axially spaced apart locations of an internal surface thereof.

BACKGROUND OF THE INVENTION

The enclosing or encasing of cylindrical objects during the course of the extrusion of a plastic sleeve has long been known, e.g. in the production of covered cables or the like. Furthermore it is known to introduce discrete cylindrical objects into a tube during the course of the extrusion thereof. Thus, for example, in U.S. Pat. No. 2,484,965 (Slaughter) there is disclosed a method of making extruded collapsible tubes which essentially consists of extruding a continuous tube by means of an extrusion cross head and successively feeding into the extrusion successive spaced-apart tube closures so that the tube is formed around the closures. Similarly, in U.S. Pat. No. 2,575,138 (Slaughter) there is disclosed a process for packaging cylindrical articles within a continuous tube comprising the steps of extruding the tube by means of an extrusion cross head, successively feeding the articles to be packaged through the cross head so as to be enclosed by the tube, the portions of the tube between the successive enclosed articles being subsequently sealed and severed.

In both cases the tube is extruded by an angular extrusion nozzle (known as an extrusion cross head) with the cylindrical objects being successively fed into the cross head by means of an appropriate pusher mechanism.

In completely analogous fashion there is disclosed in U.S. Pat. No. 3,981,452 the application of this known process in the production of an irrigation conduit in which are located at predetermined intervals, successive cylindrical units which together with the inner surface of the conduit form a plurality of emitter units.

In all cases of the prior art referred to above, the element to be enclosed by the extruded tube, whatever its nature, is of cylindrical shape and is wholly enclosed by the extruded tube.

The present invention, on the other hand, relates particularly to the production of a drip irrigation conduit, wherein the internally bonded emitter units are not of circular cross section extending across the entire periphery of the surrounding conduit, but are of limited depth with the bonded area thereof extending into the conduit for less than half the diameter thereof. Drip irrigation conduits having emitters of this kind are, for example, disclosed in our earlier U.S. Pat. No. 4,307,841.

SUMMARY OF THE INVENTION

It is an object of the present invention to provide a new method and apparatus for the production by extrusion of drip irrigation conduits having internally heat welded emitter units of this kind.

According to one aspect of the present invention, there is provided a process for producing a drip irrigation conduit having internally heat welded emitter units, the welded area of each emitter unit having a transverse, peripheral extent not greater than half the transverse peripheral extent of the conduit, comprising the steps of:

continuously extruding an irrigation conduit from an extrusion cross head at a first outer diameter and a first linear velocity;

passing the extruded conduit through an intermediate zone and into a calibrator unit so as to be drawn down to a second outer diameter which is less than the first outer diameter and so as to have a second linear velocity greater than the first linear velocity;

supporting said emitter units over a support region coaxial with the extruded conduit and extending from a first end thereof within the extruder cross-head to an opposite end thereof within the calibrator unit;

successively accelerating said supported emitter units so as to attain an emitter unit linear velocity substantially equal to said second linear velocity;

displacing each supported emitter unit at said emitter unit linear velocity into contact with said extruded conduit where the conduit has substantially attained said second linear velocity;

displacing each supported emitter unit in contact with the extruded conduit until the emitter unit is heat welded to the conduit at substantially said opposite end;

cooling the extruded conduit and internally heat welded emitter units;

successively determining the location of the heat welded emitter units in the conduit; and aperturing the conduit so as to form respective drip outlets for the emitter units.

According to another aspect of the present invention there is provided an extrusion installation for use in carrying out this process and comprising:

an extrusion cross head with an axial bore;

a calibrator unit spaced therefrom by an intermediate region;

drawing-off means located downstream of said calibrator unit for drawing off the extruded conduit through and out of the calibrator unit at a conduit linear velocity;

an emitter carrier element located coaxially with said axial bore having a first end located within said bore and a second opposite end located within said calibrator unit;

emitter feed means for successively feeding emitter units to said carrier element; and emitter displacement means for successively accelerating said emitter units along said carrier element so as to attain an emitter unit velocity substantially equal to said conduit linear velocity, for displacing said emitter units along said carrier element at said emitter unit velocity in contact with an extruded conduit when the latter has substantially attained said conduit linear velocity and displacing said emitter units along said carrier element until the emitter units are heat welded to the conduit at substantially said opposite end of said carrier element.

By virtue of the process and apparatus in accordance with the invention, it is possible to ensure that the extruded conduit is contacted, whilst still in a semi-molten malleable state, by successive emitter units which are accelerated from rest so as to attain a displacement rate substantially equal to the conduit linear velocity whereupon the emitter units contact the conduit, and are at all times supported until they are fully heat welded to the conduit, thereby ensuring the effective heat welding of the emitter units to the conduit as part of the overall extrusion process without disturbing the extrusion process or overall characteristics of the conduit.

SUMMARY OF THE DRAWINGS

For a better understanding of the present invention and to show how the same may be carried out in practice, reference will now be made to the accompanying drawings in which.

DETAILED DESCRIPTION OF PREFERRED EMBODIMENT

Figure 1:
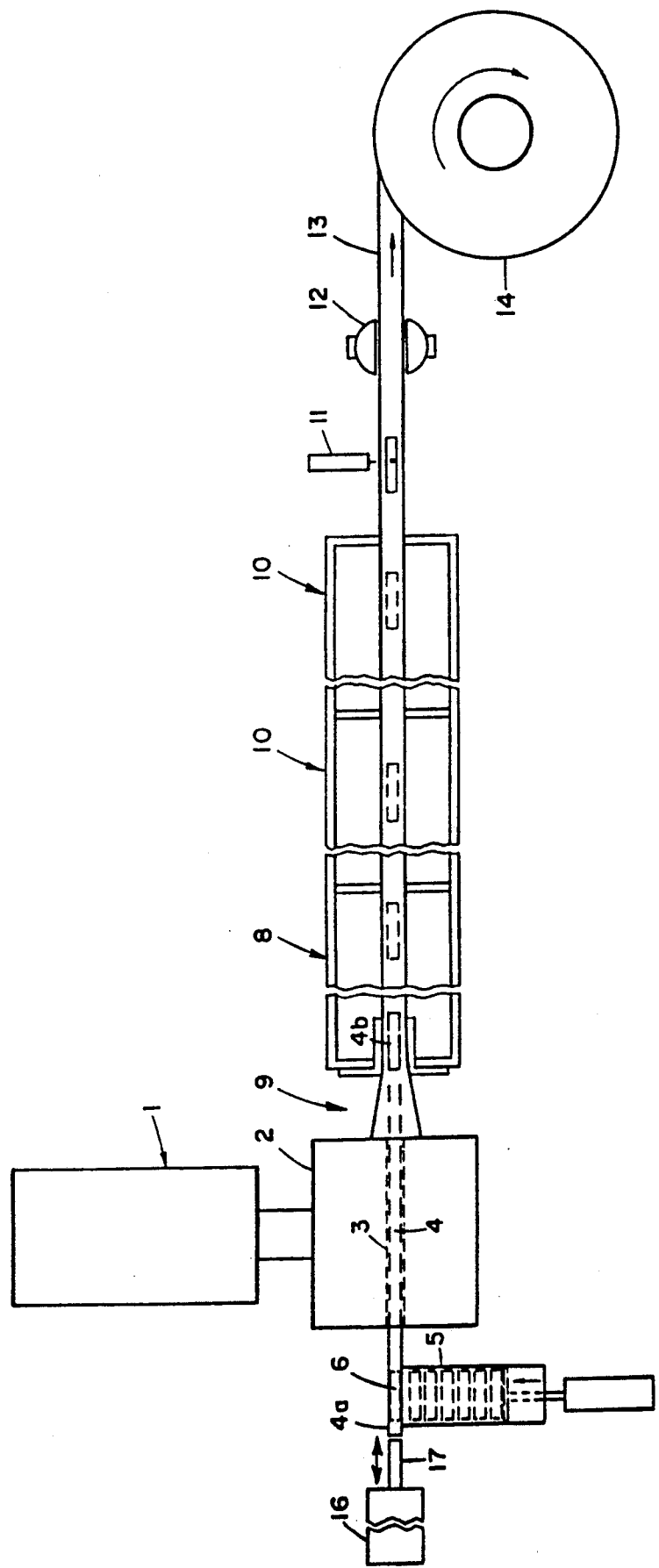
FIG. 1 is a schematic view of a drip irrigation conduit extrusion installation in accordance with the present invention.

As seen in FIG. 1 of the drawings, the installation comprises an extruder 1 provided with an extrusion cross head 2 having a bore 3 through which an elongated emitter carrier 4 coaxially extends. An upstream end 4a of the carrier 4 is juxtaposed with respect to an emitter stack 5 from which emitters 6 can be successively fed on to the upstream end of the carrier 4.

A calibration and cooling unit 8 is located downstream from the extrusion cross head 2 and is spaced therefrom by an intermediate region 9. A downstream end 4b of the carrier 4 projects into the unit 8. Downstream of the unit 8 are a plurality of further cooling units 10 followed by a conduit aperturing station 11, caterpillar type drawing off means 12 for drawing off an extruded conduit 13 and a conduit coiling mechanism 14.

An emitter displacement means 16 is located upstream of the upstream end 4a of the carrier 4 and is provided with a pusher 17 aligned with the carrier 4. The displacement means can be, for example, mechanically, electro-mechanically, or hydraulically operated so as to displace the pusher 17 at a rate which is at all times controlled in accordance with operational requirements.

Figure 2:
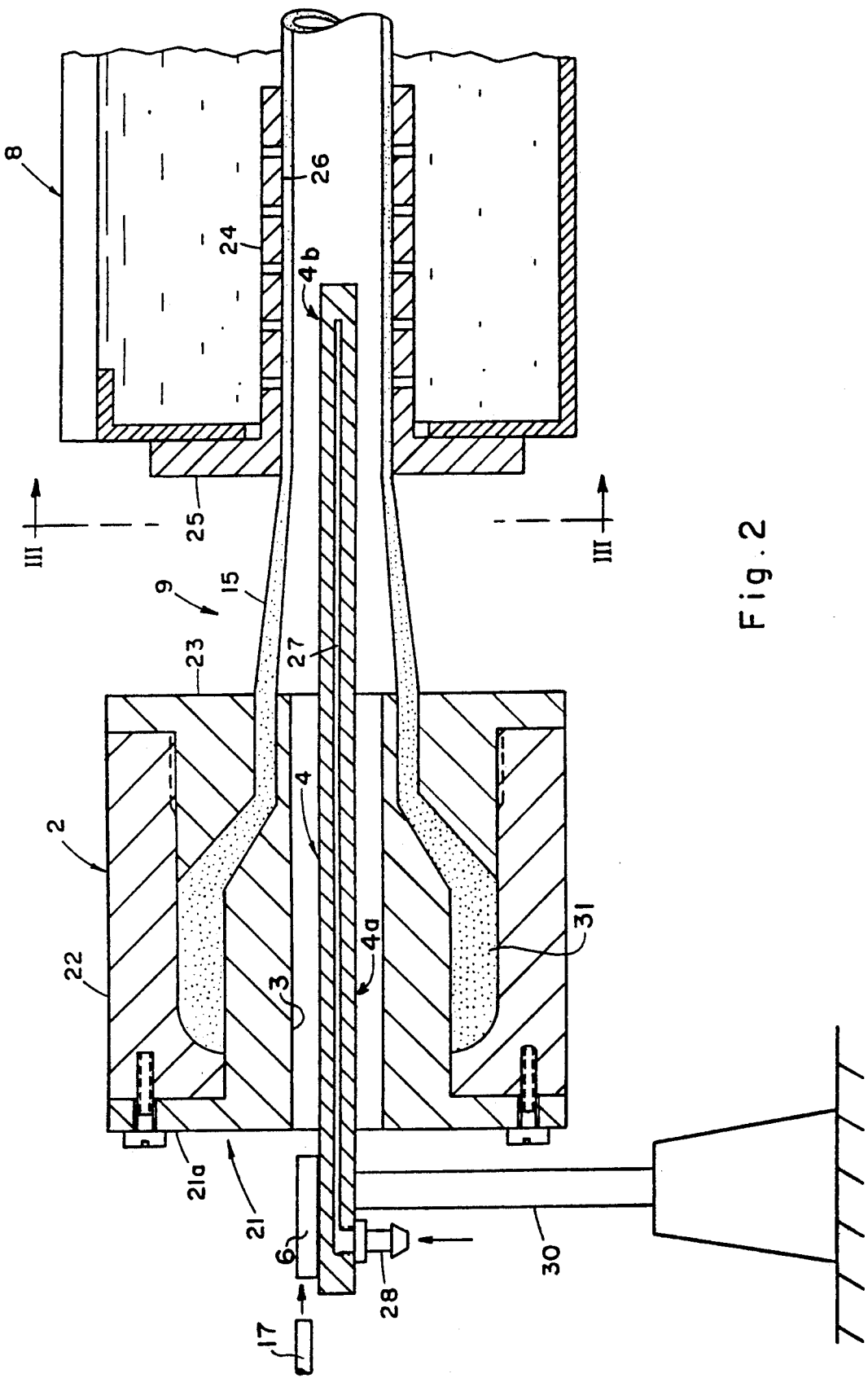
FIG. 2 is a longitudinally sectioned view, on an enlarged scale, of a portion of the installation shown in FIG. 1.
Figure 3:
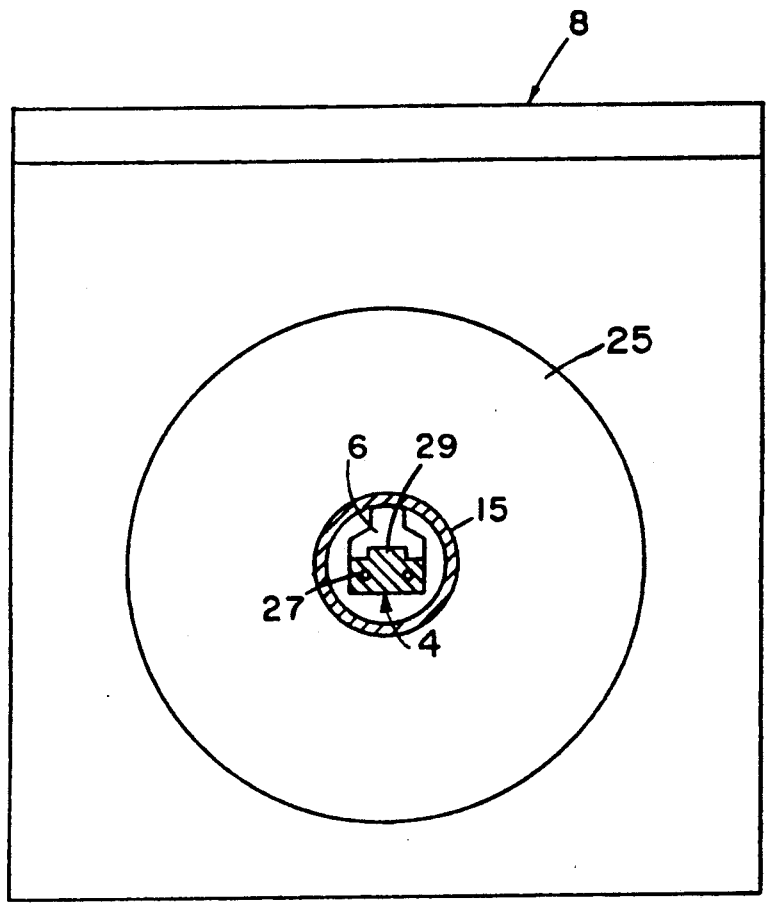
FIG. 3 is a cross-sectional view of the installation shown in FIG. 2 taken along the line III—III.

Reference will now be made to FIGS. 2 and 3 of the drawings for a more detailed description of the extrusion cross head 2, the carrier 4 and the calibration and cooling unit 8. The extrusion cross head 2 comprises a mandrel 21 having an outwardly directed flange 21a screw bolted to a cylindrical sleeve 22 in which is screw fitted a die element 23, there being defined between the die element 23 and the mandrel 21 a spacing from which is extruded the conduit 15.

Spaced from the extrusion cross head 2 by an intermediate region 9 is the calibrator and cooling unit 8 comprising an apertured calibrator tube 24 formed integrally with the calibrator flange 25 which is secured to the walls of the unit 8, the latter being filled with cooling water under a vacuum.

Extending through the axial bore 3 of the extrusion cross head 2, the intermediate region 9 and into an axial bore 26 of the calibrator tube 24 is the elongated carrier 4 which, as seen in FIG. 3 of the drawings, is formed with a pair of elongated ducts 27 which pass along the length of the carrier and serve for the passage of cooling water from an inlet nipple 28.

The carrier 4 is formed with an upper, axially directed rib 29 adapted to fit into a corresponding recess formed in a base of an emitter 6 so as to support and align the latter. The carrier 4 is supported at the upstream end 4a thereof by a support column 30.

In operation, plastic material 31 passes from the extruder 1 into the extrusion cross head 2 so as to emerge therefrom at a first linear velocity as an extruded, wide diameter, molten conduit 13. Under the traction force exerted by the drawing-off means 12, the conduit 13 passes through the narrower opening of the calibrator tube 24 with its diameter and wall thickness being reduced to substantially their final dimensions and at a second and higher linear velocity. As the extruded conduit 13 passes at this second linear velocity through the calibrator unit 8 and subsequent cooling units 10 it cools down until it reaches its final set state.

At the same time, successive emitters 6 are fed on to the upstream end 4a of the carrier 4 and are displaced by the pusher 17 along the carrier 4 so as to be accelerated up to a linear velocity substantially corresponding to the second linear velocity of the conduit until the upper surface of each successive emitter 6 contacts a spaced apart, inner surface location of the conduit when the latter is still in a semi-molten state in the region of an inlet to the calibrator unit 8 and when the conduit has substantially reached its second linear velocity. Each emitter 6 thus begins to become heat welded to the inner surface of the conduit whilst being displaced along the carrier at a linear velocity substantially equal to the second linear velocity of the conduit until, by the time the emitter has reached the end of the carrier, it is firmly heat welded to the conduit.

The displacement of the emitters 6 by the pusher 17 can be effected directly or indirectly, in the latter case via one or more intermediate elements or emitters.

It can be seen that at all times the carrier element never contacts the extruded conduit and supports the emitters at surfaces thereof remote from those surfaces of the emitters which are ultimately heat welded to the conduit.

The spacing apart of the emitters 6 within the conduit 13 is determined by time intervals between the successive displacements of the emitters 6 along the carrier 4.

Once the emitters 6 have been firmly heat welded to the conduit 13 and after the latter has emerged from the final cooling unit 10, the location of the emitter units 6 within the conduit 13 are sensed and the conduit 13 then passes the aperturing station 11 where it is apertured in positions corresponding to the emitter outlets. The conduit 13 with the internally heat welded emitters drawn off by the drawing-off mechanism is coiled by the coiling mechanism 14.

Figure 4A:
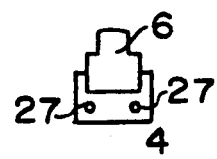
FIGS. 4a and 4b show cross-sectional views of various modifications of a detail of the installation shown in FIGS. 2 and 3.
Figure 4B:
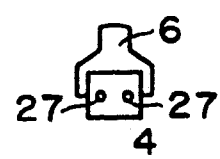

Whilst in the embodiment shown in FIGS. 2 and 3 of the drawings the carrier 4 is so constructed as to have the emitter units 6 supported thereby and aligned thereon (further embodiments illustrating this being shown in FIGS. 4a and 4b of the drawings), the carrier construction can be so designed that emitter units are effectively suspended from and aligned by the carrier.

Furthermore, whilst in the embodiment specifically described above the carrier 4 projects into the calibrator unit 8 so as to ensure that contact between the emitter units and the extruded conduit and the full heat welding thereof take place when the latter has achieved its final substantially constant velocity, the carrier 4 may extend only to the region of the inlet of the calibration unit 8. This situation is less ideal as far as the ultimate quality of the product compared with that described in detail above wherein it is ensured that the heat welding of the emitters 6 to the conduit 13 does not result in undue stressing of the conduit and does not interfere with the stability of the extrusion process or with the quality of the extruded conduit.

I claim:

1. An extrusion apparatus for producing a drip irrigation conduit assembly comprising a tubular conduit and emitter units heat welded to the inner surface of said conduit at axially spaced apart weld areas, said conduit inner surface having a peripheral extent in a transverse cross-section of said irrigation conduit assembly and each said weld area having a transverse extent in said transverse cross-section, and wherein each emitter unit has a limited depth such that the length of each transverse extent of each weld area is less than half the length of said peripheral extent, comprising:
    extrusion cross-head means for extruding at a first linear velocity a tubular conduit having a first diameter and having an axial bore provided with an inlet and an outlet;
    calibrator unit means for reducing the diameter of said extruded conduit from said first diameter to a second diameter smaller than said first diameter and being spaced from said extrusion means by an intermediate distance and having an inlet and an outlet;
    drawing-off means located downstream of said calibrator unit means for drawing the extruded conduit through and out of the calibrator unit at said second diameter and at a second linear velocity which is greater than said first linear velocity;
    an elongated emitter carrier element for supporting said emitter units for successive movement along its length from a first end part to a second opposite end part thereof and extending coaxially with said axial bore of said extrusion cross-head means with said first end part located adjacent the inlet of said axial bore and with said second end part located in the region of said calibrator unit means inlet;
    emitter feed means for successively feeding emitter units into supported relationship with said carrier element at said first end part thereof; and
    emitter displacement means for successively accelerating said emitter units along said carrier element from said first end part thereof and out of contact with said extruded conduit so as to attain an emitter unit velocity substantially equal to said second linear velocity, for continuing to displace said emitter units along said carrier element at said emitter unit velocity in contact with said extruded conduit when the latter has substantially attained said second diameter and for continuing to displace said emitter units along said carrier element until the emitter units are heat welded to the conduit when they have reached substantially said second opposite end of said carrier element.

2. An extrusion apparatus according to claim 1 wherein said displacement means includes a displaceable pusher aligned with said carrier element and adapted to engage said emitter carried by said carrier element.

3. An extrusion apparatus according to claim 2 wherein said carrier element is provided with cooling fluid transmission means.

4. An extrusion apparatus according to claim 1 wherein said carrier element is designed to have said emitters suspended therefrom.

5. An extrusion apparatus according to claim 1, wherein the second end part of the emitter carrier element is located within said calibrator unit means.

6. An extrusion apparatus for producing a drip irrigation conduit assembly comprising a tubular conduit and emitter units heat welded to the inner surface of said conduit at axially spaced apart weld areas, said conduit inner surface having a peripheral extent in a transverse cross-section of said irrigation conduit assembly and each said weld area having a transverse extent in said transverse cross-section, and wherein each emitter unit has a limited depth such that the length of each transverse extent of each weld area is less than half the length of said peripheral extent, comprising:
    extrusion cross-head means for extruding at a first linear velocity a tubular conduit having a first diameter and having an axial bore provided with an inlet and an outlet;
    calibrator unit means for reducing the diameter of said extruded conduit from said first diameter to a second diameter smaller than said first diameter and being spaced from said extrusion means by an intermediate distance and having an inlet and an outlet;
    drawing-off means located downstream of said calibrator unit means for drawing the extruded conduit through and out of the calibrator unit at said second diameter and at a second linear velocity which is greater than said first linear velocity;
    an elongated emitter carrier element for supporting said emitter units for successive movement along its length from a first end part to a second opposite end part thereof and extending coaxially with said axial bore of said extrusion cross-head means with said first end part located adjacent the inlet of said axial bore and with said second end part located in the region of said calibrator unit means inlet;
    emitter feed means for successively feeding emitter units into supported relationship with said carrier element at said first end part thereof; and
    emitter displacement means for displacing said emitter units along said carrier element at an emitter unit velocity substantially equal to said second linear velocity so as to contact with said extruded conduit so as to become heat welded to the conduit when they have reached substantially said second opposite end of said carrier element.

7. An extrusion apparatus according to claim 6, wherein the second end part of the emitter carrier element is located within said calibrator unit means.

* * * * *